United States Patent [19]

Mase et al.

[11] 4,154,058

[45] May 15, 1979

[54] EXHAUST CLEANING DEVICE FOR A MULTI-CYLINDER INTERNAL COMBUSTION ENGINE

[75] Inventors: Yoshio Mase, Niiza; Shinichi Natsuume, Higashikurume, both of Japan

[73] Assignee: Honda Giken Kogyo Kabushiki Kaisha, Tokyo, Japan

[21] Appl. No.: 876,321

[22] Filed: Feb. 8, 1978

[30] Foreign Application Priority Data

Nov. 4, 1977 [JP] Japan .................. 52-132282

[51] Int. Cl.² ............... F01N 3/15; F01N 3/10
[52] U.S. Cl. ..................... 60/293; 60/299; 60/305; 60/313
[58] Field of Search ............. 60/293, 312, 313, 314, 60/299, 304, 305

[56] References Cited

U.S. PATENT DOCUMENTS

| | | | |
|---|---|---|---|
| 3,653,212 | 4/1972 | Gast | 60/293 |
| 3,662,541 | 5/1972 | Sawada | 60/293 |
| 3,906,722 | 9/1975 | Garcea | 60/293 |
| 3,943,710 | 3/1976 | Lange | 60/288 |
| 4,069,666 | 1/1978 | Nakamura | 60/278 |

Primary Examiner—Douglas Hart
Attorney, Agent, or Firm—Haseltine, Lake & Waters

[57] ABSTRACT

A catalytic exhaust cleaning device for a high-power multi-cylinder engine of the type including independent carburetors and exhaust pipes for the respective cylinders. The exhaust pipes are interconnected for fluid communication therebetween at locations upstream of the respective catalytic converters arranged therein so that the latter are evenly fed with exhaust gases of substantially the same composition and volume and with substantially equal amounts of secondary air and operate effectively with substantially the same high efficiency. The exhaust communicating pipe interconnecting two adjacent exhaust pipes is divided into two sections, which are fixed at one end to the respective exhaust pipes and held at the other end in aligned abutting relation by a radially expansible tubular joint member, which is fixed to one of the two pipe sections and clamped against the other section. This structure not only facilitates assembly of the communicating and exhaust pipes but effectively prevents any thermal deformation of the communicating pipe.

9 Claims, 6 Drawing Figures

EXHAUST CLEANING DEVICE FOR A MULTI-CYLINDER INTERNAL COMBUSTION ENGINE

BACKGROUND OF THE INVENTION

1. Field of the Invention

This invention relates to exhaust cleaning devices for multi-cylinder internal-combustion engines and more particularly to those of the catalytic type.

2. Prior Art

Previously known in the art of multi-cylinder internal-combustion engines are high-power engines of the type including independent carburetors connected to the respective intake ports of the engine cylinders and independent exhaust pipes connected to the respective exhaust ports thereof. Such multiple carburetor and exhaust-pipe construction is aimed at maximizing the engine output per unit weight but, since the cylinders are each fed with a fuel-air mixture independently through the associated carburetor, more or less variations in air-fuel ratio are unavoidable between the mixtures fed to the respective cylinders on account of the manufacturing and assembly errors of the carburetors and associated parts. Also, variations in pulsation of exhaust gas flow can hardly be avoided between the independent exhaust pipes connected to the respective engine cylinders.

With this type of internal-combustion engine, it has been proposed for cleaning the engine exhaust to arrange catalytic converters in the respective exhaust pipes while feeding secondary air into the latter at locations upstream of the respective catalytic converters through reed valve means. With this arrangement, however, the catalytic converters are fed with exhaust gases differing in composition and volume of unburnt ingredients such as carbon monoxide (CO) and hydrocarbons (HC) on account of the non-uniformity in composition and volume of the air-fuel mixtures being fed to the respective engine cylinders. In addition, the amounts of secondary air introduced into the respective exhaust pipes are substantially different from each other due to variations in operation of the reed valves and pulsation of exhaust gas flows from the respective cylinders. Under these circumstances, the catalytic converters are unable fully to exhibit their cleaning performance as they are fed with secondary air at different flow rates while being fed with exhaust gases differing in composition and volume of unburnt ingredients and the cleaning efficiency of the entire system is impaired.

SUMMARY OF THE INVENTION

An object of the present invention is to provide a novel catalytic type exhaust cleaning device for a multi-cylinder internal-combustion engine of the type described which is designed to enable the catalytic converters used therein to operate at all times in an effective manner thereby to obtain a materially improved overall cleaning efficiency.

To this end, the present invention contemplates arranging catalytic converters in the respective exhaust pipes of the engine and feeding such catalytic converters uniformly with exhaust gases substantially the same in composition and volume of unburnt ingredients such as HC and CO and also uniformly with secondary air.

A specific object of the present invention is to provide an exhaust cleaning device of the character described which includes exhaust communicating means arranged to provide fluid communication between at least two of the exhaust pipes, which are connected to the respective engine cylinders differing from each other in the timing of the exhaust, and having a simple structure which is particularly easy to assemble.

The above and other objects, features and advantages of the present invention will become apparent from the following description of a few preferred embodiments of the invention illustrated in the accompanying drawings.

DESCRIPTION OF THE PREFERRED EMBODIMENTS

Figure 1:
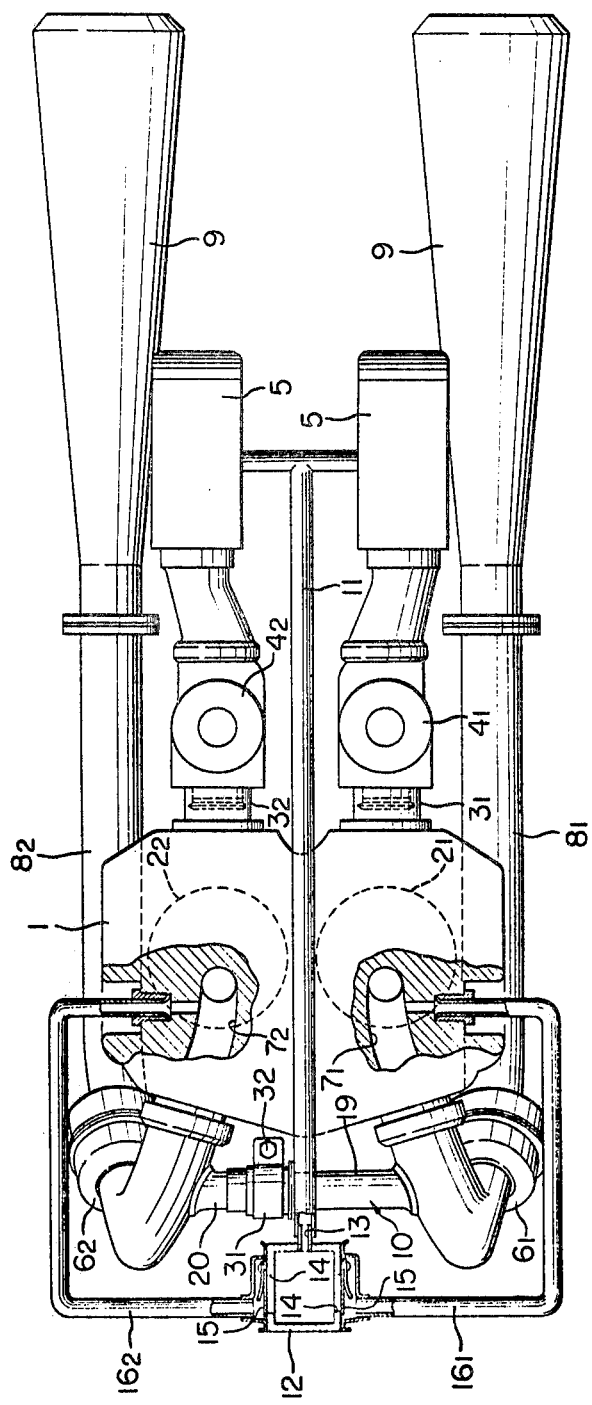
FIG. 1 is a partially broken-away plan view showing a preferred embodiment of the invention applied to a two-cylinder, four stroke internal combustion engine.
Figure 2:
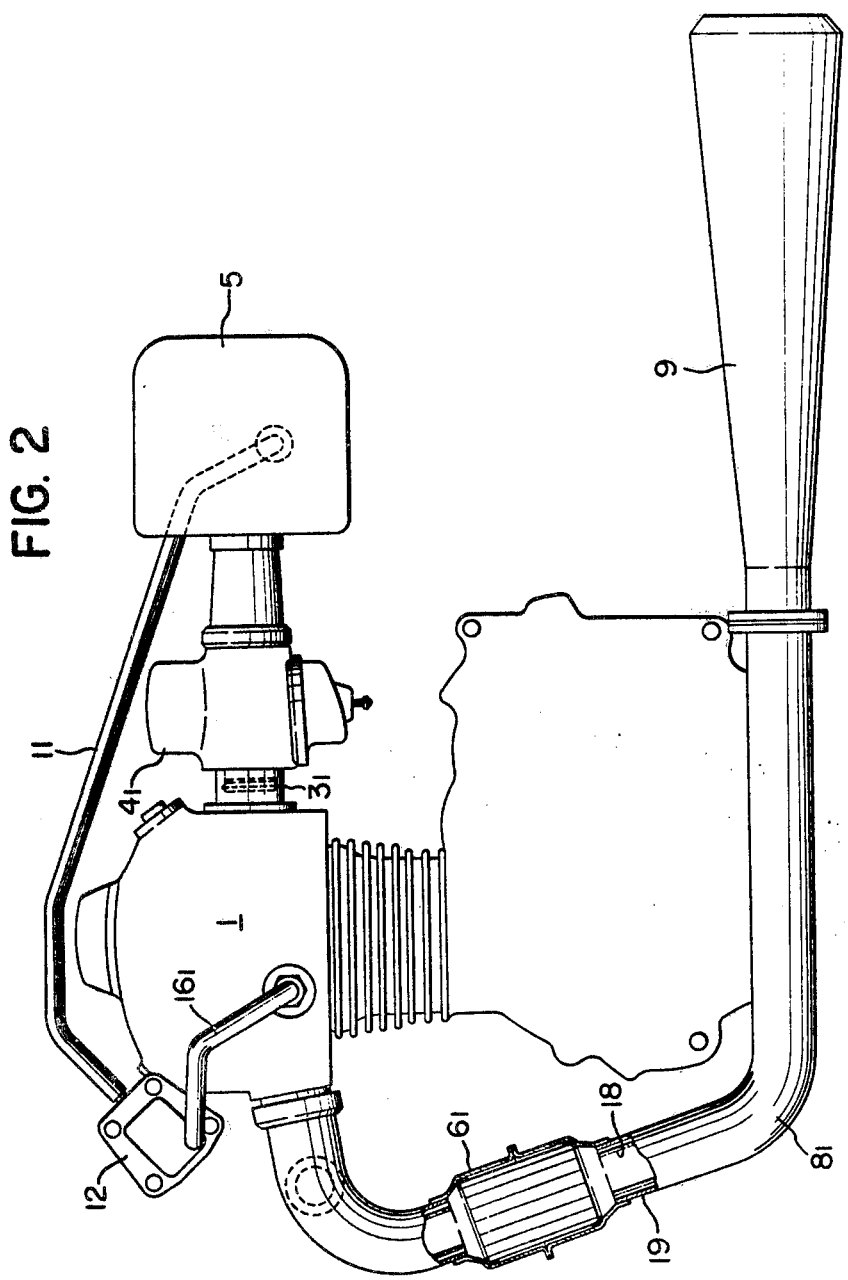
FIG. 2 is a partially broken-away side-elevational view thereof.

Referring to the drawings and first to FIGS. 1 and 2, therein is shown a two-cylinder internal-combustion engine for motorcycle use which includes an exhaust cleaning device embodying the principles of the present invention.

Reference numerals $2_1$ and $2_2$ indicate a first and a second cylinder arranged in the engine body 1 in parallel relation to one another. A first and a second independent carburetor $4_1$ and $4_2$ are connected to the intake ports of the first and second cylinders $2_1$ and $2_2$, respectively, via first and a second intake pipes $3_1$ and $3_2$ so that the cylinders $2_1$ and $2_2$ are each fed independently with an air-fuel mixture of a ratio adjusted by the associated first or second carburetor $4_1$ or $4_2$. Reference numeral 5 indicates air cleaners respectively connected to the air inlet openings of the first and second carburetors $4_1$ and $4_2$.

Connected to the respective exhaust ports $7_1$ and $7_2$ of the first and second cylinders $2_1$ and $2_2$ are first and second exhaust pipes $8_1$ and $8_2$ which are arranged symmetrically in relation to the medial line of the engine body 1 and bent to extend over the front and bottom faces of the engine body 1. Mufflers 9 are secured to the respective exhaust pipes $8_1$ and $8_2$ at the downstream end thereof. In order to raise the inertia and pulsation effects of the exhaust gas flow in the first and second exhaust pipes $8_1$ and $8_2$ to the full extend, thereby to improve the charging efficiency of the first and second cylinders $2_1$ and $2_2$, the exhaust pipes are made equal in length and substantially uniform in cross-sectional area over the entire length thereof extending between the exhaust port $7_1$ or $7_2$ and the muffler 9.

The first and second exhaust pipes $8_1$ and $8_2$ are provided with a first and a second catalytic converter $6_1$ and $6_2$, respectively, at the same location thereon and are held in fluid communication with each other by means of an exhaust communicating pipe 10, which is arranged between the exhaust pipes at locations upstream of the respective catalytic converters $6_1$ and $6_2$.

Referring again to FIGS. 1 and 2, the motorcycle engine is provided with a secondary-air system which includes a main secondary-air suppy pipe 11 branched at one end for connection with the air cleaners 5. The main pipe 11 extends over the top of the engine body 1 and is connected at the other end to the inlet 13 of a valve casing 12, which is arranged above the engine body 1 forwardly thereof. The valve casing 12 is provided at its left-hand and right-hand sides with outlet openings 14, to which a first and a second secondary-air pipe $16_1$ and $16_2$ are connected by way of respective check or non-return valves 15. The first and second secondary-air pipes $16_1$ and $16_2$ are connected at the other end to the respective exhaust ports $7_1$ and $7_2$ of the first and second cylinders $2_1$ and $2_2$.

It is to be noted that the non-return valves 15 operate under the inertia and pulsation effects of exhaust gas flow occurring during engine operation in a manner such that fresh secondary air is directed through the air cleaners 5 and the main secondary-air pipe 11 into the valve casing 12 and further directed therefrom through the non-return valves 15 and first and second secondary-air pipes $16_1$ and $16_2$ into the exhaust ports $7_1$ and $7_2$ of the first and second cylinders $2_1$ and $2_2$.

Figure 3:
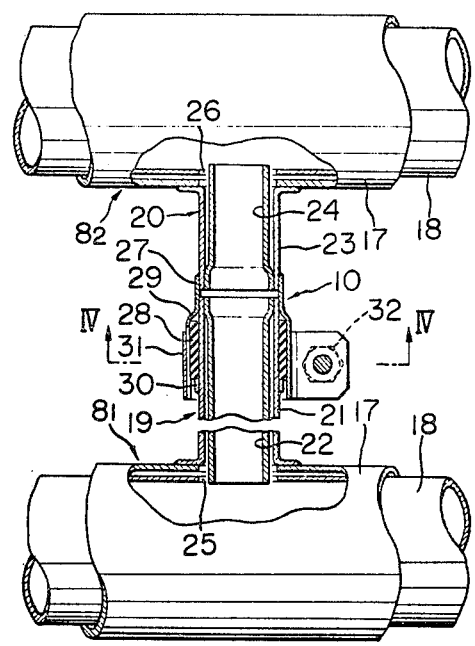
FIG. 3 is a partially broken-away plan view of the exhaust interconnecting structure employed in the embodiment of FIGS. 1 and 2.
Figure 4:
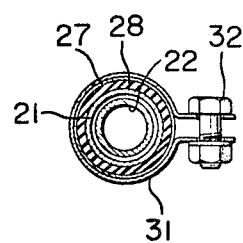
FIG. 4 is a transverse cross sectional view taken along line IV—IV in FIG. 3.

Reference will next be had to FIGS. 3 and 4, which illustrate in detail the structure of the exhaust communicating pipe 10 which interconnects the first and second exhaust pipes $8_1$ and $8_2$.

As shown in FIGS. 3 and 4, the first and second exhaust pipes $8_1$ and $8_2$ are each constructed of an outer tube 17, of plain steel, and an inner tube 18, of stainless steel, fitted in the outer tube 17 in radially spaced relation thereto. The exhaust communicating pipe 10 is divided into two sections 19 and 20 which are secured to the first and second exhaust pipes $8_1$ and $8_2$, respectively. One of the pipe sections, 19, of communicating pipe 10 is formed of an outer tube 21, of plain steel, and an inner tube 22, of stainless steel, fitted therein in radially spaced relation and the outer and inner tubes 21 and 22 are welded together at one end adjacent to the other pipe section 20 of communicating pipe 10. Similarly, the other pipe section 20 is formed of an outer tube 23, of plain steel, and an inner tube 24, of stainless steel, fitted therein in radially spaced relation and the tubes 23 and 24 are welded together at one end adjacent to the pipe section 19. The outer tube 21 of pipe section 19 is welded at the other end to the outer periphery of the first exhaust pipe $8_1$ while the inner tube 22 is fitted at the other end into an opening 25 formed in the adjacent wall of the first exhaust pipe $8_1$. Similarly, the outer tube 23 of pipe section 20 is welded at the other end to the outer periphery of the second exhaust pipe $8_2$ while the inner tube 24 is fitted at the other end into an opening 26 formed in the adjacent wall of the second exhaust pipe $8_2$. The two pipe sections 19 and 20 of exhaust communicating pipe 10, fixedly mounted on the respective exhaust pipes $8_1$ and $8_2$, as described above, are held at their free end in aligned abutting relation to each other, as will be described below in detail.

Reference numeral 27 indicates a tubular joint member which is formed with a plurality of longitudinally extending slits for radial expansion and contraction and fixed at one end to the free end portion of section 20, such as by welding. As clearly shown in FIG. 3, the tubular joint member 27 has an axial length sufficient to cover not only the abutting end portions of the pipe sections 19 and 20 but also a substantial portion of the pipe section 19 adjoining the pipe section 20. A heat-resisting seal member 28 of asbestos or graphite is inserted in the annular space defined between the pipe section 19 and that portion of the tubular joint member 27 which covers the pipe section 19 and is enlarged in diameter. The seal member 28 is held against axial displacement, abutting at one end against the shoulder portion 29 of the tubular joint member 27 and at the other end against an annular stop 30 fixed to the pipe section 19 around the outer periphery thereof. A clamp strap 31 is wrapped around the outer periphery of the tubular joint member 27 and can be tightened by bolt and nut means 32 arranged on opposite end portions of the strap, which extend radially away from the tubular joint member 27 substantially parallel to one another. Thereby, the joint member 27 is effectively clamped against the pipe section 19 through the medium of the heat-resisting seal 28 with the result that the two pipe sections 19 and 20 of exhaust communicating pipe 10 are connected integrally with each other through the tubular joint member 27.

It will be seen that the divided structure of the exhaust communicating pipe 10, consisting of the two sections 19 and 20 connected together by tubular joint means 27, not only facilitates the assembly of the exhaust communicating pipe 10 on the first and second exhaust pipes $8_1$ and $8_2$ but also allows axial expansion and contraction of the exhaust communicating pipe 10 so that any deformation or damage of the pipe sections due to thermal stresses is effectively prevented.

Description will next be made of the operation of the embodiment of the present invention shown in FIGS. 1 and 2.

As is usual with ordinary four-stroke engines, in operation of the motorcycle engine illustrated, the four strokes of suction, compression, explosion and exhaust, of the cycle of engine operation are repeated alternately in the first and second cylinders $2_1$ and $2_2$ and air-fuel mixtures adjusted respectively by the first and second carburetors $4_1$ and $4_2$ are alternately drawn into the two cylinders independently of each other. After the compression and explosion strokes, the combustion products are exhausted alternately out of the first and second cylinders $2_1$ and $2_2$ respectively into the first and second exhaust pipes $8_1$ and $8_2$. On this occasion, since the two exhaust pipes $8_1$ and $8_2$ are in fluid communication with each other by means of the exhaust communicating pipe 10, as described hereinbefore, a portion of the exhaust gases flowing into the first exhaust pipe $8_1$ from the first cylinder $2_1$ diverges into the second exhaust pipe $8_2$ through the exhaust communicating pipe 10. Similarly, a portion of the exhaust gases flowing into the second exhaust pipe $8_2$ from the second cylinder $2_2$ diverges into the first exhaust pipe $8_1$ through the exhaust communicating pipe 10. In addition, after the exhaust gases have passed into the exhaust pipes $8_1$ and $8_2$ in the manner described, a reciprocating flow of such exhaust gases is formed between the exhaust pipes through the exhaust communicating pipe 10 in accordance with the pressure fluctuations in the exhaust system. It will be readily noted, therefore, that the catalytic converters $6_1$ and $6_2$, arranged in the respective exhaust pipes $8_1$ and $8_2$ at locations downstream of the exhaust communicating pipe 10, are at all times fed evenly with exhaust gases of substantially the same composition including unburnt ingredients such as HC and CO. Also, the resistance to the engine exhaust is materially reduced as it is directed in two separate flows to the first and second catalytic converters $6_1$ and $6_2$.

On the other hand, under the inertia and pulsation effects of exhaust gases flowing from the exhaust ports $7_1$ and $7_2$ into the first and second exhaust pipes $8_1$ and $8_2$, the non-return valves 15 respectively arranged in the first and second secondary-air pipes $16_1$ and $16_2$ communicating with the respective exhaust ports $7_1$ and $7_2$ operate alternately to allow secondary air to flow into the exhaust pipes $8_1$ and $8_2$ in substantially equal amounts. The secondary air entering the first exhaust pipe $8_1$ is partially directed into the second exhaust pipe $8_2$ through the exhaust communicating pipe 10. Similarly, a portion of the secondary air entering the second exhaust pipe $8_2$ proceeds through the exhaust communicating pipe 10 into the first exhaust pipe $8_1$. In this manner, secondary air is evenly distributed to the catalytic converters $6_1$ and $6_2$, respectively arranged in the first and second exhaust pipes $8_1$ and $8_2$.

To summarize, in the exhaust gas cleaning device arranged as described above, the first and second catalytic converters $6_1$ and $6_2$ are evenly fed with exhaust gases of substantially the same composition including unburnt ingredients such as HC and CO while at the same time being fed with stubstantially equal amounts of secondary air and serve to clean the engine exhaust with a much improved efficiency despite the multiple carburetor and exhaust-pipe structure of the associated high-performance multi-cylinder internal-combustion engine.

Figure 5:
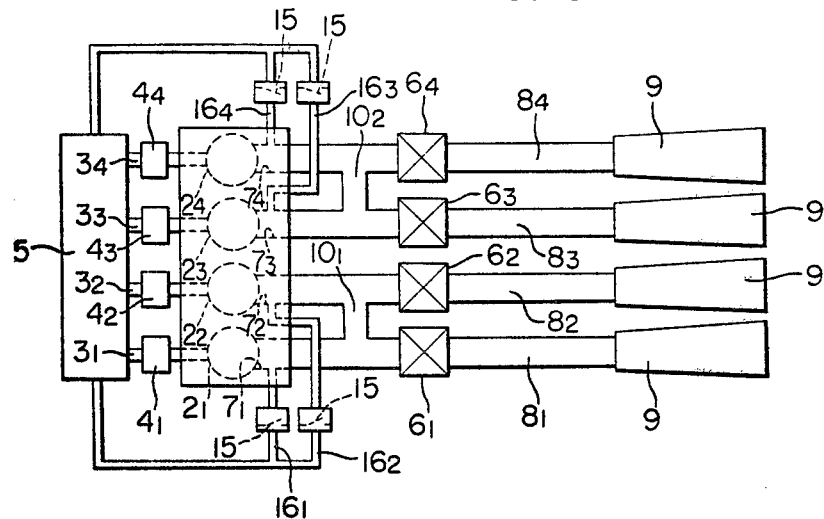
FIG. 5 is a schematic plan view of a four-cylinder internal-combustion engine embodying the present invention.

Referring next to FIG. 5, which schematically illustrates a four-cylinder internal-combustion engine embodying the present invention, the engine body 1 includes a parallel arrangement of a first, second, third and fourth cylinder $2_1$ to $2_4$. Connected to the intake ports of the respective cylinders are a first, second, third and fourth intake pipe $3_1$ and $3_4$ which are provided with a first, second, third and fourth carburetor $4_1$ to $4_4$ connected with respective air cleaners 5. Connected to the respective exhaust ports $7_1$ to $7_4$ of the first, second, third and fourth cylinders $2_1$ to $2_4$ are a first, second, third and fourth exhaust pipe $8_1$ to $8_4$ in which a first, second, third and fourth catalytic converter $6_1$ to $6_4$ are arranged intermediate the ends of the respective exhaust pipes. As with the case of the two-cylinder engine described hereinbefore, the exhaust pipes $8_1$ to $8_4$ are so designed in length and cross-sectional area as to enable the exhaust gas flows therein to exhibit satisfactory inertia and pulsation effects.

In order that the exhaust gas flow in each of the four exhaust pipes $8_1$ and $8_4$ may branch, at a location upstream of the catalytic converter arranged therein, into an adjacent one of the exhaust pipes, exhaust communicating pipes $10_1$ and $10_2$ are arranged respectively between the first and second exhaust pipes $8_1$ and $8_2$ and between the third and fourth exhaust pipes $8_3$ and $8_4$ for fluid communication therebetween. In the four-cylinder engine, it is obvious that the four cylinders $2_1$ to $2_4$ differ from each other in timing of exhaust. As shown, a first, second, third and fourth secondary air pipe $16_1$ to $16_4$ is connected at one end to the respective exhaust ports $7_1$ to $7_4$ of first, second, third and fourth cylinders $2_1$ to $2_4$ and held at the other end in fluid communication with an air cleaner unit 5. A non-return valve 15 is arranged in a downstream portion of each of the secondary-air pipes $16_1$ to $16_4$. With this arrangement, the four cylinders $2_1$ to $2_4$ are fed with secondary air independently of each other through the respective secondary-air pipes $16_1$ to $16_4$ as the non-return valves 15 arranged therein operate under the inertia and pulsation effects of exhaust gas flow. Further, as with the case of the embodiment previously described, the catalytic converters $6_1$ to $6_4$ arranged in the respective exhaust pipes $8_1$ to $8_4$ are fed uniformly with exhaust gases of substantially the same composition including unburnt ingredients such as HC and CO while at the same time being fed with substantially equal amounts of secondary air.

Figure 6:
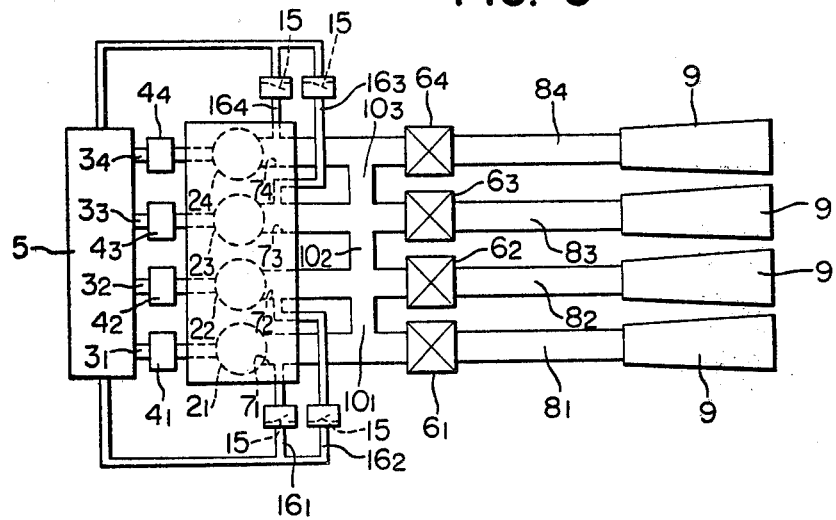
FIG. 6 is a view similar to FIG. 5, illustrating a modification of the embodiment shown in FIG. 5.

FIG. 6 illustrates another preferred embodiment of the present invention as again applied to a four-cylinder internal-combustion engine of the type including independent carburetors and exhaust pipes for the respective engine cylinders. The structure of this embodiment is generally the same as that of the embodiment shown in FIG. 5 except that the four exhaust pipes $8_1$ to $8_4$ in this embodiment are held in fluid communication with each other by the provision of three exhaust communicating pipes $10_1$, $10_2$ and $10_3$ which are arranged respectively between exhaust pipes $8_1$ and $8_2$, between $8_2$ and $8_3$, and between $8_3$ and $8_4$ so that exhaust gases flowing in any one of the four exhaust pipes $8_1$ to $8_4$ may diverge into all of the other exhaust pipes. As will be readily noted, this embodiment is quite the same in functional effect as those previously described.

To summarized, according to the present invention, in a high-power internal-combustion engine of the type including independent carburetors and exhaust passages provided for the respective engine cylinders, catalytic converters are arranged in the respective exhaust passages, which are associated with the respective cylinders differing from each other in timing of exhaust and interconnected for fluid communication therebetween at locations upstream of the respective catalytic converters. Further, secondary-air passages, each having a non-return valve inserted therein, are arranged in fluid communication with the respective exhaust ports of the engine cylinders. With such arrangement, the catalytic converters arranged in the respective exhaust pipes are fed at all times uniformly with exhaust gases of substantially the same composition including unburnt ingredients such as HC and CO as well as with optimum amounts of secondary air and thus can all function with substantally the same high cleaning efficiency. As the result of this, exhaust emmisions such as HC and CO are materially reduced despite the multiple carburetor and exhaust-pipe structure of the high-power engine.

The exhaust communicating pipe inter-connecting the exhaust pipes, which are connected to the exhaust ports of the respective cylinders independently from each other is divided into two sections which are fixed at one end to the respective exhaust pipes and held at the other, free end in aligned abutting relation to each other by means of a radially expansible tubular joint member which is fixed to one of the communicating pipe sections and extends to cover the abutting end portions thereof and at least a neighboring portion of the other pipe section. The tubular joint member is clamped around the latter pipe section by appropriate clamp means. With such arrangement, the exhaust pipes to which the respective communicating pipe sections are fixed can be readily interconnected for fluid communication therebetween simply by tightening the clamp means, which serves to hold the pipe sections in aligned abutting relation. Furthermore, the exhaust communicating pipe so constructed is prevented from undergoing any deformation due to thermal stress since it is allowed to axially expand and contract. The heat-resisting seal inserted between one of the communicating pipe sections and the tubular joint member not only helps to prevent thermal deformation of the pipe sections but also serves to prevent any gas leakage through the joint region of the exhaust communicating pipe for any extended period of use.

Though several preferred embodiments of the present invention have been shown and described, it will be apparent to those skilled in the art that various changes and modifications may be made therein without departing from the spirit or the scope of the invention as defined in the appended claims.

What is claimed is:

1. In a multi-cylinder internal-combustion engine of the type including a plurality of independent carburetors respectively connected to intake ports of the cylinders of the engine through the intermediary of respective intake pipes and a plurality of independent exhaust pipes respectively connected to exhaust ports of the cylinders, an exhaust cleaning device comprising: a plurality of catalytic converters respectively arranged in the exhaust pipes intermediate the ends thereof; an exhaust communicating pipe interconnecting at least two of the exhaust pipes to provide fluid communication therebetween at locations upstream of said catalytic converters, said two exhaust pipes being connected to respective cylinders differing from each other in timing of exhaust stroke; a plurality of secondary-air pipes connecting the respective exhaust ports of the engine cylinders with the atmosphere; and a plurality of non-return valves respectively arranged in said secondary-air pipes intermediate the ends thereof and operable independently from each other under the inertia and pulsation effects of exhaust gas flow to feed the respective engine cylinders with secondary air.

2. An exhaust cleaning device as claimed in claim 1, in which said exhaust communicating pipes comprises: two separate pipe sections fixed at one end to the mutually facing sides of the respective exhaust pipes associated with said exhaust communicating pipe and detachably connected at the other end with each other in aligned abutting relation; a radially expansible tubular joint member fixed to one of said two pipe sections and covering at least the neighboring portion of the other pipe section; an annular heat-resisting seal between the inner peripheral surface of said tubular joint member and the outer peripheral surface of said other pipe section; and clamp means mounted on said tubular joint member around the outer periphery thereof for clamping said tubular joint member against said other pipe section through the medium of said annular heat-resisting seal.

3. An exhaust cleaning device as claimed in claim 2, in which said tubular joint member has a plurality of longitudinally extending slits formed therein.

4. An exhaust cleaning device as claimed in claim 1, further comprising a plurality of air cleaners respectively connected to the air inlet openings of said carburetors, said secondary-air pipes being connected at one end to the exhaust ports of the respective engine cylinders and at the other end to said respective air cleaners.

5. An exhaust cleaning device as claimed in claim 1, wherein said exhaust communicating pipe is connected to adjacent exhaust pipes.

6. An exhaust cleaning device as claimed in claim 1 wherein one said exhaust communicating pipe connects adjacent exhaust pipes to provide inter-communication between all of said exhaust pipes.

7. An exhaust cleaning device as claimed in claim 2, wherein said two separate pipe sections each comprises an outer tube affixed to the respective exhaust pipe and an inner tube communicating with the interior of the respective exhaust pipe.

8. An exhaust cleaning device as claimed in claim 7 wherein the inner tube is stainless steel.

9. An exhaust cleaning device as claimed in claim 7 wherein said tubular joint member is interposed between the outer tubes of the pipe sections.

* * * * *